United States Patent [19]

Sakai et al.

[11] Patent Number: 4,875,099

[45] Date of Patent: Oct. 17, 1989

[54] DEVICE FOR MERGING PLURAL SENSOR OUTPUTS ONTO A SINGLE CONDUCTOR

[75] Inventors: Shunji Sakai; Tohru Kitagawa; Kunikazu Suzuki; Naohiro Watanabe, all of Tokyo, Japan

[73] Assignee: Oki Electric Industry Co., Ltd., Tokyo, Japan

[21] Appl. No.: 197,403

[22] Filed: May 23, 1988

[30] Foreign Application Priority Data

| May 22, 1987 | [JP] | Japan | 62-123692 |
|---|---|---|---|
| May 22, 1987 | [JP] | Japan | 62-123693 |
| May 22, 1987 | [JP] | Japan | 62-123694 |

[51] Int. Cl.$^4$ .............................................. H04N 3/14
[52] U.S. Cl. ................................. 358/213.11; 358/471
[58] Field of Search ...................... 358/213.11, 213.13, 358/294; 250/578

[56] References Cited

U.S. PATENT DOCUMENTS

| 4,352,128 | 9/1982 | Ohori et al. | 358/294 |
| 4,432,022 | 2/1984 | Tokumitsu | 358/213.13 |
| 4,449,151 | 5/1984 | Yokota et al. | 358/294 |
| 4,691,114 | 9/1987 | Hasegawa et al. | 250/578 |
| 4,692,812 | 9/1987 | Hirahara et al. | 358/294 |
| 4,712,134 | 12/1987 | Murakami | 358/213.13 |
| 4,754,338 | 6/1988 | Hideshima | 250/578 |

OTHER PUBLICATIONS

"Selecting and Using Image Sensors, Mitsuo Oshima, Nikkan Kogyo Shimbunsha", Jan. 25, 1985, pp. 41–49 and 196–200.

Primary Examiner—Jin F. Ng
Assistant Examiner—Stephen Brinich
Attorney, Agent, or Firm—Wenderoth, Lind & Ponack

[57] ABSTRACT

A contact-type image scanner, having a plurality of CCD image sensors arranged in a row, includes a timing controller for individually controlling a clock control signal for each of the CCD image sensors, and a merging circuit for merging the outputs from the CCD image sensors into a signal for transmission on a single electrical conductor.

17 Claims, 7 Drawing Sheets

DEVICE FOR MERGING PLURAL SENSOR OUTPUTS ONTO A SINGLE CONDUCTOR

BACKGROUND OF THE INVENTION

This invention relates to a contact-type image scanner, and more particularly to the signal processing of contact-type CCD image sensors used in a contact-type image scanner.

The prior art in this field has been described in, for example, *Imeji Sensa no Erabikata, Tsukaikata* (Selecting and Using Image Sensors) by Mitsuo Oshima, Nikkan Kogyo Shimbunsha, January 25, 1985, pp. 41–49 and 198–200.

As shown in the above-cited reference, the basic function of this type of device was to transfer photoreceptor data, which are stored as electric charges in a set of photodiodes during the interval between a pair of transfer pulses $\phi_T$, through a photogate and transfer gate to a CCD (Charge-Coupled Device) analog register, then out through a preamplifier which reshapes the data by means of a reset pulse $\phi_R$.

Three CCD image sensor configurations have been used.

FIG. 1 through FIG. 6 are block diagrams and timing charts of these configurations.

Figure 1:
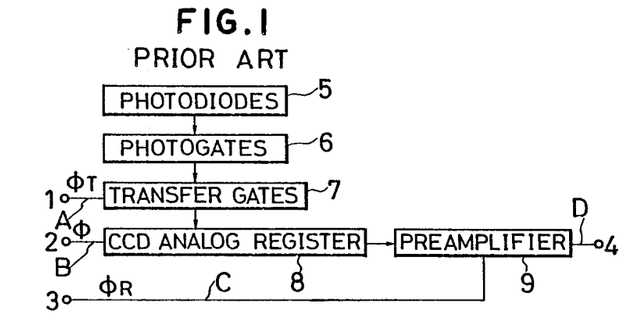
FIG. 1 is a block diagram of a first prior art CCD image sensor.
Figure 2:
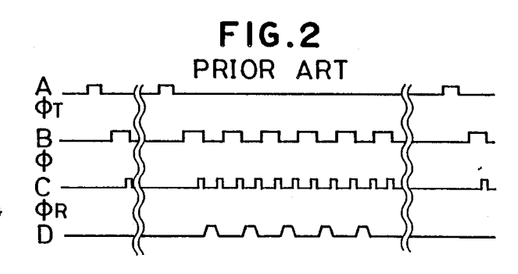
FIG. 2 is a timing chart of the operation of the image sensor shown in FIG. 1.

In FIG. 1 and FIG. 2, the numeral 1 denotes an input terminal for a transfer pulse ($\phi_T$), A is a signal line for $\phi_T$, 2 is an input terminal for a clock pulse ($\phi$), B is a signal line for $\phi$, 3 is an input terminal for a reset pulse ($\phi_R$), C is a signal line for $\phi_R$, D is a signal line for output data, and 4 is an output terminal for the output data.

In FIG. 1, the data received by the photodiodes 5 pass through a photogate 6, are time-limited by $\phi_T$ in a transfer gate 7, and are fed to the CCD analog register 8. Thus only the light data received during the interval from one $\phi_T$ to the next $\phi_T$ can charge the photodiodes 5 to produce photosensor outputs. The photosensor outputs are fed in parallel to the bits of the CCD analog register 8.

The data are output in serial form on the $\phi$ clock of the CCD analog register 8 to a preamplifier 9. In the preamplifier 9, data corresponding to each bit are sampled on $\phi_R$ and output from the output terminal 4. As shown in FIG. 2, the data are output on the falling edge of $\phi$ and reset on the rising edge of $\phi_R$.

Figure 3:
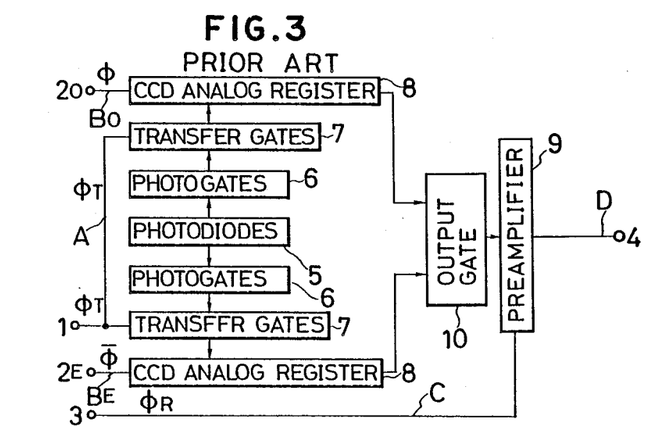
FIG. 3 is a block diagram of a second prior art CCD image sensor.
Figure 4:
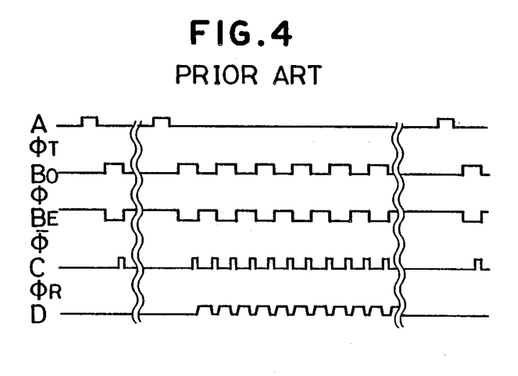
FIG. 4 is a timing chart of the operation of the image sensor shown in FIG. 3.

In FIG. 3 and FIG. 4, the photodiodes 5 are divided into an even-numbered row and an odd-numbered row, each of which feeds through a photogate 6, a transfer gate 7, and a CCD analog register 8 to an output gate 10. At the output gate 10, the outputs from each photosensor are multiplexed, then they are sampled by a preamplifier 9. In FIG. 3 and FIG. 4, $2_O$ and $2_E$ are input terminals for $\phi$ and $\bar{\phi}$, and $B_O$ and $B_E$ are signal lines for $\phi$ and $\bar{\phi}$.

The basic data transfer operation proceeds similarly to FIG. 1 and FIG. 2. This system is frequently used in CCD sensors with around 2K bits, because it reduces the transfer time by half as compared with the CCD sensor shown in FIG. 1 and FIG. 2.

Figure 5:
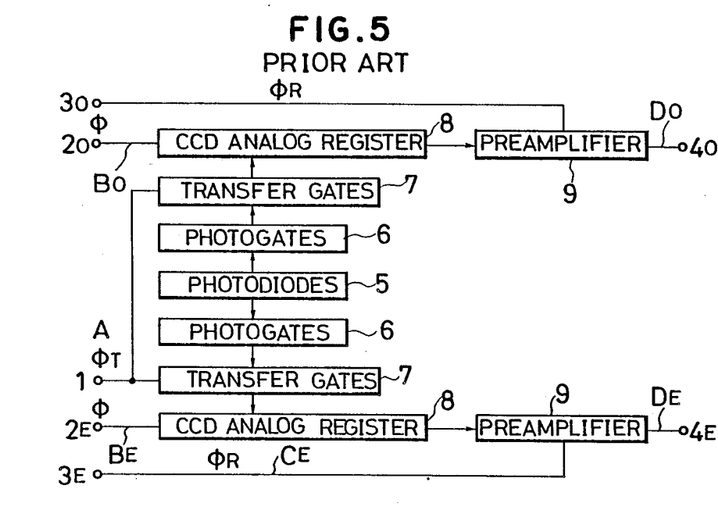
FIG. 5 is a block diagram of a third prior art CCD image sensor.
Figure 6:
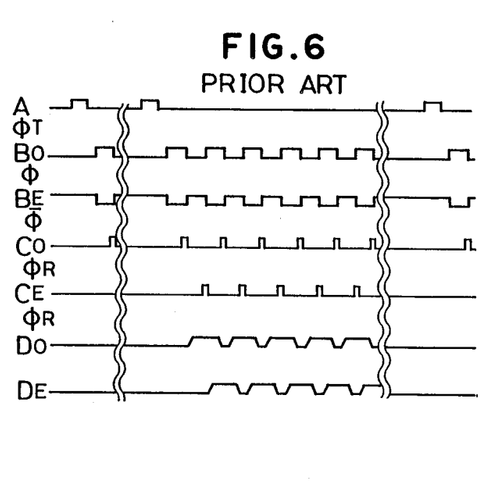
FIG. 6 is a timing chart of the operation of the image sensor shown in FIG. 5.

In FIG. 5 and FIG. 6, as in FIG. 3 and FIG. 4, the photoreceptor data are divided into an even row and an odd row, but in this system there is no output gate; instead there are two outputs with independent preamplifiers 9. This system shortens the transfer time as in FIG. 3 and FIG. 4, and increases the pulse width of the output signal. In FIG. 5 and FIG. 6, $3_O$ and $3_E$ are input terminals for $\phi_R$, $C_O$ and $C_E$ are signal lines for $\phi_R$, $D_O$ and $D_E$ are output data, and $4_O$ and $4_E$ are output terminals for the output data.

The system in FIG. 1 and FIG. 2 will be called the single-output system, the system in FIG. 3 and FIG. 4 will be called the multiplex-output system, and the system in FIG. 5 and FIG. 6 will be called the dual-output system.

Image scanners using these CCD image sensors fall into two general types: the reducing type and the contact type. A reducing-type image scanner scans an image by means of one or more CCD image sensors with ultra-small photocells, which receive reflected light from a light source in amounts proportional to an image being scanned through a reducing optical system. A contact-type image scanner has no reducing optical system, so the scanning resolution is in one-to-one ratio to the resolution of the photocells.

Figure 7:
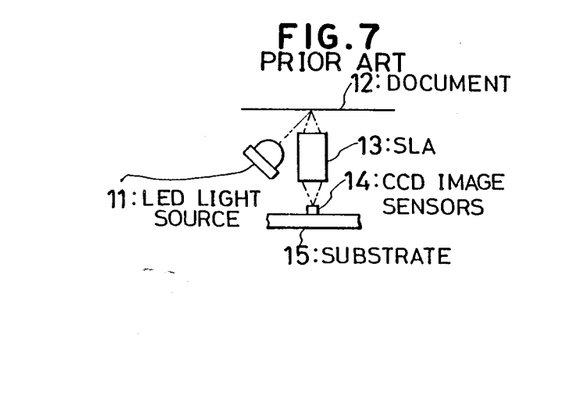
FIG. 7 is a cross-sectional view of a contact-type image scanner unit to which the prior art systems as well as this invention applies.
Figure 8:
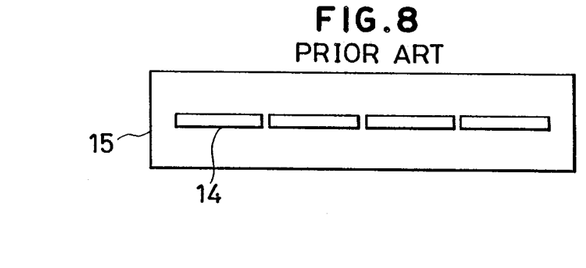
FIG. 8 is a plan view of a CCD image sensor to which the prior art systems as well as this invention applies.

Next, a contact-type image sensor to which the prior art systems as well as this invention applies will be described with reference to FIG. 7 and FIG. 8.

An LED light source 11 illuminates a line on a document 12. The light reflected by the image on the document is focused by a Selfoc lens array (SLA) 13 and received by the photocells of a CCD image sensor 14 disposed on a substrate 15. The main scanning size of each CCD image sensor is shorter than the size (e.g., width) of the document, so a row of several sensors are used. The driving system depends on which of the types of CCD image sensors shown in FIG. 1 through FIG. 6 is used.

In a contact-type image scanner having several of the CCD image sensors described above arranged in a row, however, regardless of which driving system was employed, independent driving of each sensor entailed a great deal of complex processing of the output signals, and operation was slow. These points were unsatisfactory from a technical standpoint.

SUMMARY OF THE INVENTION

An object of this invention is to provide a simplified contact-type image scanner with a reduced amount of signal processing.

Another object of this invention is to provide a simplified contact-type image scanner with faster operation.

Another object of this invention is to provide a contact-type image scanner with a simplified circuit configuration.

According to the invention, there is provided a contact-type image scanner having a plurality of CCD image sensors arranged in a row, comprising:
  timing control means for individually controlling at least one of the clock control signals for each of said CCD image sensors; and
  a merging circuit for merging the outputs from the CCD image sensors.

DETAILED DESCRIPTION OF THE EMBODIMENTS

An embodiment of this invention will be explained in detail with reference to the drawings.

Figure 9:
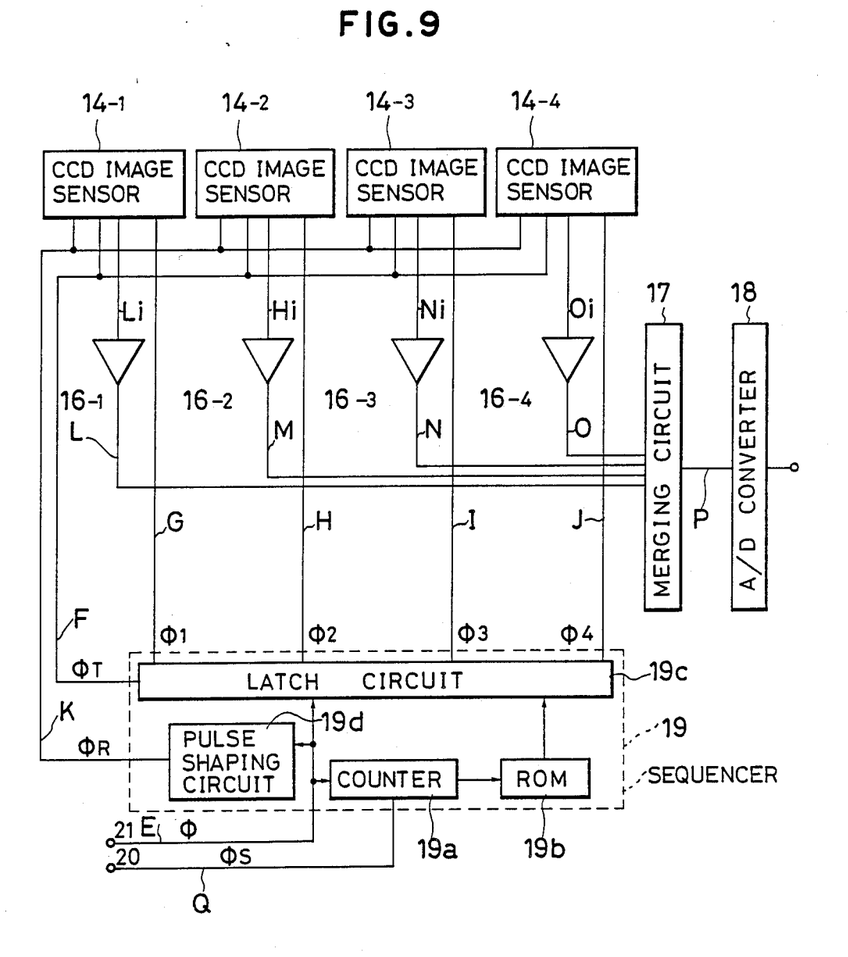
FIG. 9 is a block diagram of a contact-type image scanner illustrating an embodiment of the present invention.

FIG. 9 is a block diagram of a contact-type image scanner illustrating an embodiment of the present invention.

In the illustrated embodiment, the image scanner comprises four CCD image sensors 14-1 through 14-4 arranged in a row. Each of the image sensors 14-1 through 14-4 comprises 512 bits or pixels. A sequencer 19 comprising a counter 19a, a ROM (Read Only Memory) 19b, a latch circuit 19c, and a pulse reshaping circuit 19d, receives a clock pulse $\phi$ from an input terminal 21 external to the sequencer 19 through a signal line E, and a start pulse $\phi_S$ from an input terminal 20 through a signal line Q. The outputs sent from the sequencer 19 to the CCD image sensors 14-1 through 14-4 include $\phi_T$, which is output through a common signal line F, and $\phi_R$, which is output through a common signal line K. The clock pulses $\phi_1$ through $\phi_4$ are connected via the signal lines G to J to the CCD image sensors 14-1 through 14-4 individually, and the outputs of the CCD image sensors 14-1 through 14-4 are connected via respective output nodes Li to Oi to sensor amplifiers 16-1 through 16-4. The outputs from the sensor amplifiers are connected via signal lines L to O to a merging circuit 17 which merges them into a single output that is sent on a signal line P to an A/D converter 18, where it is digitized. The merging circuit may be in the form of an analog adder.

First, when a series of clock pulses $\phi$ and start pulse $\phi_S$ are furnished to the sequencer 19 from the outside, the sequencer 19 generates $\phi_T$. The period of this pulse $\phi_T$ is the charging time of the photocells of the CCD image sensor 14-1 through 14-4, and is also the one-line scanning time. Output of $\phi_T$ is synchronized with the external start pulse.

The photoreceptor data or pixel data in the form of charges which have accumulated during a set time in the respective photocells or pixels are transferred in parallel on $\phi_T$ to the CCD analog register, so if $\phi_1$ to $\phi_4$ (synchronized with $\phi_R$) are applied after $\phi_T$, the operation similar to that already shown in the prior art enables the photoreceptor data to be serially output and obtained as sensor outputs at a designated timing, or at an interval of a designated number. The sensor output timing is determined by $\phi_1$ to $\phi_4$, so the sensor output timing of each CCD image sensor, or the sensor output timing of each group consisting of a plurality of (e.g., two) CCD image sensors, can be set arbitrarily. The sensor outputs of the CCD image sensors 14-1 through 14-4 are serially input to corresponding sensor amplifiers 16-1 through 16-4. After being amplified by the sensor amplifiers 16-1 through 16-4, the sensor outputs are input to the merging circuit 17. The sensor outputs are obtained as a single output from the merging circuit 17, which becomes the input signal to the A/D converter 18; it would therefore be undesirable to have the individual sensor outputs overlap. Such overlap of the sensor outputs can be easily avoided by control of the timing of $\phi_1$ to $\phi_4$ such that the pulses of the clock signals $\phi_1$ to $\phi_4$ are not produced simultaneously: For instance, series of clock pulses constituting the clock signals $\phi_1$ to $\phi_4$ are successively applied to the CCD image sensors. In an alternative embodiment, the series of the clock signals to a plurality of (e.g., two) CCD image sensors are supplied simultaneously but the individual clock pulses to the individual pixels are produced at different timings, e.g., successively or alternately.

Figures 10A, 10B, 10C, 10D:
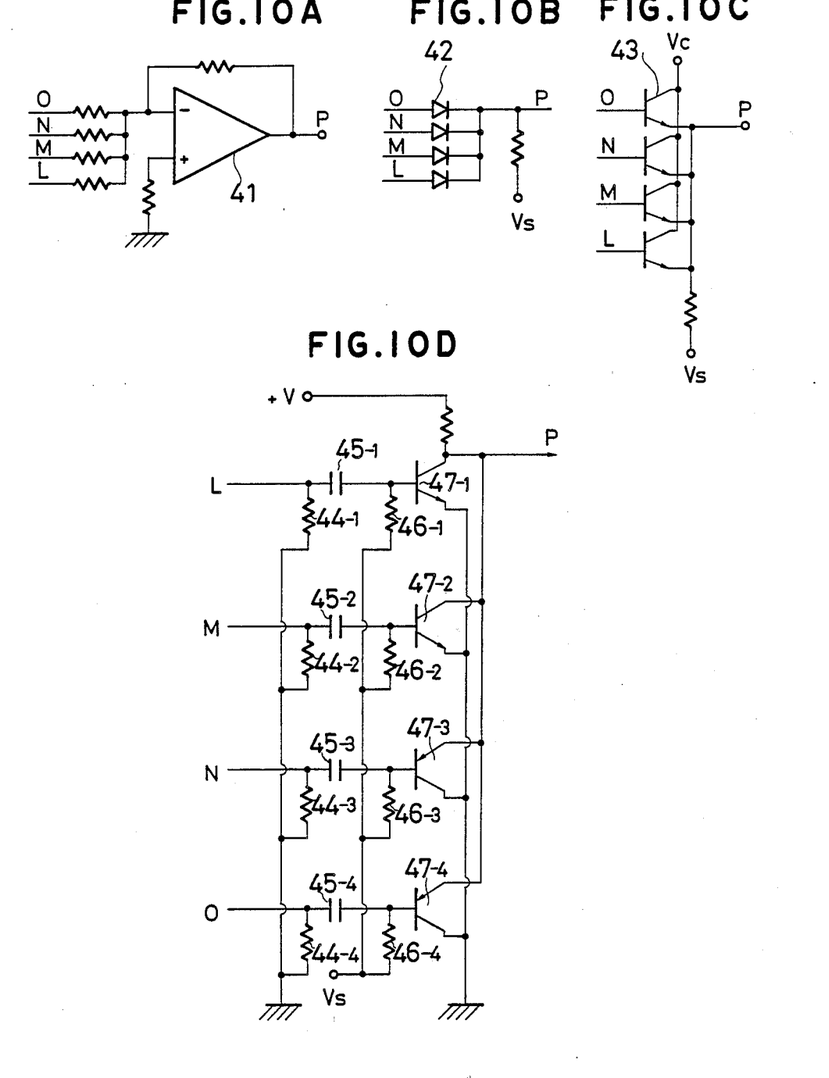
FIGS. 10A through 10D show configurations of the merging circuit of the contact-type image scanner.

Any of the configurations shown in the drawings from FIG. 10A to FIG. 10D for the merging circuit 17 gives a satisfactory output signal. In FIG. 10A the outputs from the sensor amplifiers are connected to the load input of an amplifier 41. In FIG. 10B the outputs from the sensor amplifiers are connected to the anode ends of individual diodes 42. In FIG. 10C the sensor amplifier outputs are connected to the bases of individual NPN transistors 43, and the output signal is obtained from the emitters of the transistors 43. In FIG. 10D, the outputs of the CCD image sensors 14-1 to 14-4 are received as current outputs by the merging circuit 17, and are converted to voltages by the resistors 44-1 to 44-4. Since the potentials of the signals are extremely small, the capacitors 45-1 to 45-4 and resistors 46-1 to 46-4 can be used to set the signals to standard levels, so that the signal groups are converted to signals having the same standard level, without destroying the original shape of the sensor output, and these signals provide the base potentials for the transistors 47-1 to 47-4. The transistors 47-1 to 47-4 have an emitter follower configuration in which the signal groups are current-amplified and merged. In this way it is possible to obtain a single sensor output signal on the signal line P without affecting the output impedances of the CCD image sensors 14-1 to 14-4.

The outputs of the sequencer 19 provide timing pulses to be described later.

Figure 11:
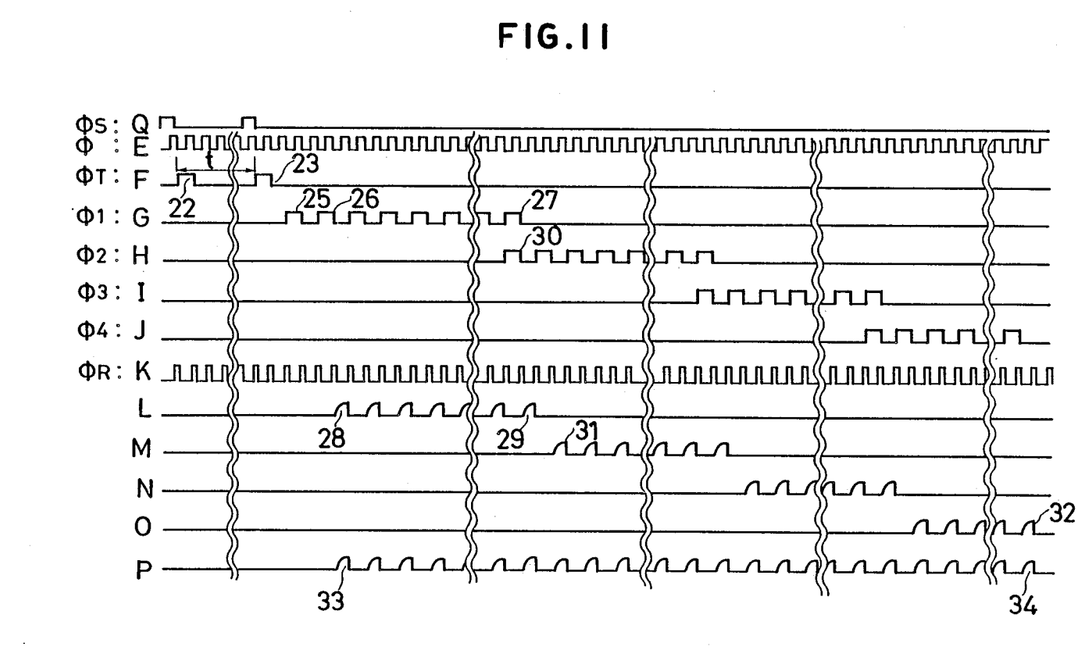
FIG. 11 is a timing chart of the operation of the contact-type image scanner shown in FIG. 9.

The operation of this contact-type image scanner will be explained with reference to the timing chart in FIG. 11.

This embodiment uses four CCD image sensors of the single-output type (shown in FIG. 1 and FIG. 2).

The first output of the photoreceptor data accumulated during the time t from $\phi_T 22$ to $\phi_T 23$ comes from the first CCD image sensor 14-1.

Normally, the pulse $\phi_T 23$ would be followed by data output on the first pulse 25 of the $\phi_1$ input, but in this embodiment one dummy bit is required in the CCD image sensors 14-1 through 14-4, so the data output 28 occurs on the rising edge of $\phi_R$ after the fall of the second pulse 26. The data from the first CCD image sensor 14-1 are read out sequentially. In this embodiment (which has 512 bits per chip) the 512th bit of data is output on the falling edge of the 513th pulse 27 counted from the first pulse, and this is the last data output from the first CCD image sensor.

Next the data from the second CCD image sensor 14-2 are output. The first $\phi_2$ pulse 30 is read at the same time as the last pulse 27 of the CCD image sensor 14-1 (because it is a dummy bit), so the first data 31 from the second CCD image sensor 14-2 is output in sequence following the last data 29 from the first CCD image sensor 14-1.

Through repetitions of these operations (four times in this embodiment), the process for one line ends after the final data 32. An output like that shown in the drawing is obtained on the signal line P by merging of the output data in the merging circuit 17. The data from the first data 33 to the last data 34 follow a regular, continuous sequence which can be sampled by an A/D converter, thereby simplifying the signal processing.

Although this embodiment employed an array of four CCD image sensors, similar effects can be obtained with any number of sensors. It should also be clear that this system can easily be implemented for CCD image sensors with the multiplex-output system (FIG. 3 and FIG. 4) and the dual-output system (FIG. 5 and FIG. 6).

As described in detail above, the above embodiment enables the output data from a plurality of CCD image sensors in a contact-type image scanner to be merged without overlap by individual control of their clock pulses, so that the same data processing by a device such as an A/D converter can be carried out as for a single CCD image sensor.

This has the following advantages:
(1) There is no loss of time.
(2) Since the individual CCD image sensors operate through direct control of their clock signals, a single analog signal with a high S/N ratio can be obtained through simple analog signal addition.
(3) A large number of CCD image sensors can be operated as if they were a single CCD image sensor, so the digitizing process and the signal processing following digitization can be simplified.

In the embodiment described above, four CCD image sensors are accessed in turn. That is, clock pulses $\phi_1$ to $\phi_4$ are applied to the four sensors one after another. In another embodiment, four sensors are divided into two groups, each group consisting of two CCD image sensors, and the CCD image sensors of each group are accessed simultaneously. The pixels of the two CCD image sensors of the same group are accessed alternately. This embodiment will be explained with reference to FIG. 12.

Figure 12:
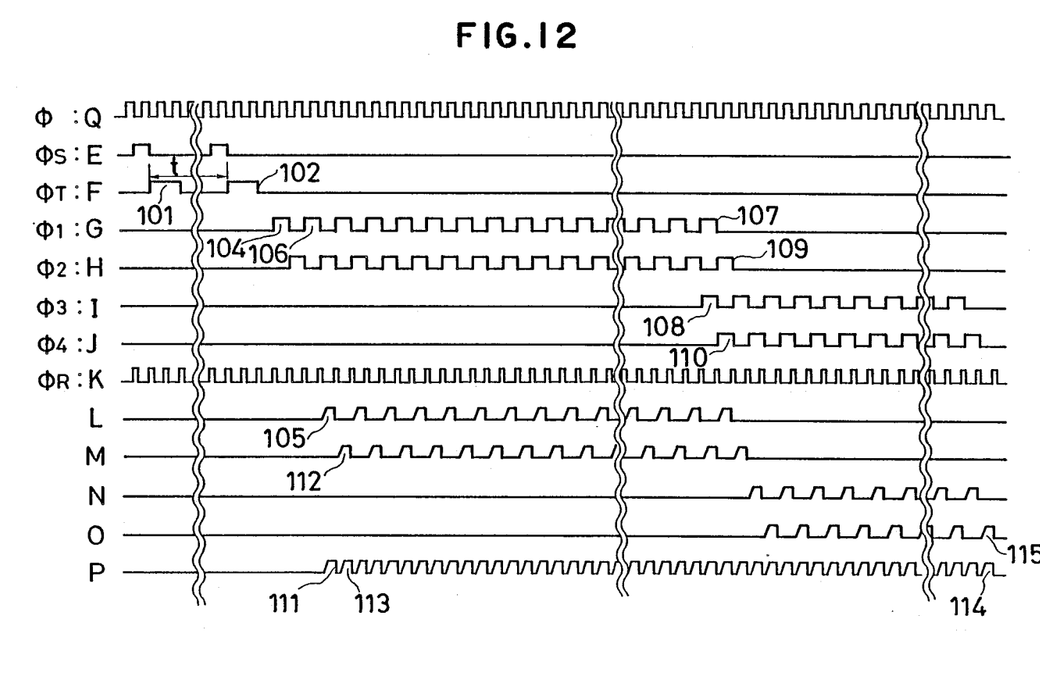
FIG. 12 is a timing chart of the operation of another embodiment of the contact-type image scanner.

First, during the interval of length t from $\phi_T$ 101 to $\phi_T$ 102, the photocells in the CCD image sensors accumulate charges of photoreceptor data. From $\phi_T$ 102 until the next $\phi_T$ arrives, the sensor outputs created during the charge accumulation time t are output on the signal lines G to J. Normally, the pulse $\phi_T$ 102 would be followed by data output (from any one of the CCD image sensors from 14-1 through 14-4) on the first $\phi_1$ pulse 104, but in this embodiment too one dummy bit is required in the CCD image sensors 14-1 through 14-4, so the first data output 105 occurs on the rising edge of $\phi_R$ after the fall of the second pulse 106. The first CCD image sensor 14-1 receives 513 $\phi_1$ pulses. In this embodiment there are 512 pixels per chip, and the DF (Duty Factor) is 50%.

In addition, the second CCD image sensor 14-2 receives 513 $\phi_2$ pulses. In the $\phi$ pulse timing, $\phi_2$ has a phase delay of 180° with respect to $\phi_1$. In other words, $\phi_1$ and $\phi_2$ run in parallel with a fixed time delay so that the output of the merging circuit will have a regular, dense waveform. The sequencer 19 also generates $\phi_3$ and $\phi_4$ for the third CCD image sensor 14-3 and the fourth CCD image sensor 14-4, with the same relationship as between the first CCD image sensor 14-1 and the second CCD image sensor 14-2. The final pulse 107 of the first CCD image sensor 14-1 is generated at the same time as the initial pulse of the third CCD image sensor 14-3, and the final pulse 107 of the second CCD image sensor 14-2 is generated at the same time as the initial pulse of the fourth CCD image sensor 14-4. These relationships give rise to the sensor outputs on the signal lines L to O shown in the timing chart. After being merged into a single signal by the merging circuit 17, the sensor output data can be sampled by the A/D converter. The signal data input to the A/D converter begins with the data 111, which is the first pulse 105 from the first CCD image sensor 14-1, followed by the first pulse 112 from the second CCD image sensor 14-2, which is input as the second pulse 113, and so on until the final pulse 114 (the final pulse 115 from the fourth CCD image sensor).

As described in detail above, in the above embodiment, two CCD image sensors are read at a time. But the pixel signals of the individual pixels are read at different timings. The pixel signals of the pixels of the different CCD image sensors of the same group are read alternately.

Although the output data sequence is a little complex, the amount of data processing can be reduced by use of a look-up table, for example, enabling the signal processing to be simplified.

In the embodiments described above, sense amplifiers 16-1 to 16-4 are disposed between the image sensors 14-1 to 14-4 and the merging circuit 17. In another embodiment illustrated in FIG. 13, a single sense amplifier 16 is disposed between the merging circuit 17 and the A/D converter 18. The sense amplifiers 16-1 to 16-4 in FIG. 9 are eliminated.

The direct analog addition of the output data from each CCD image sensor enables the number of sensor amplifiers to be reduced and, due in particular to a capacitive coupling, reduces the signal propagation loss. It is thus possible to obtain a contact-type image scanner with a simple circuit configuration which facilitates analog processing and has low power consumption.

Figure 13:
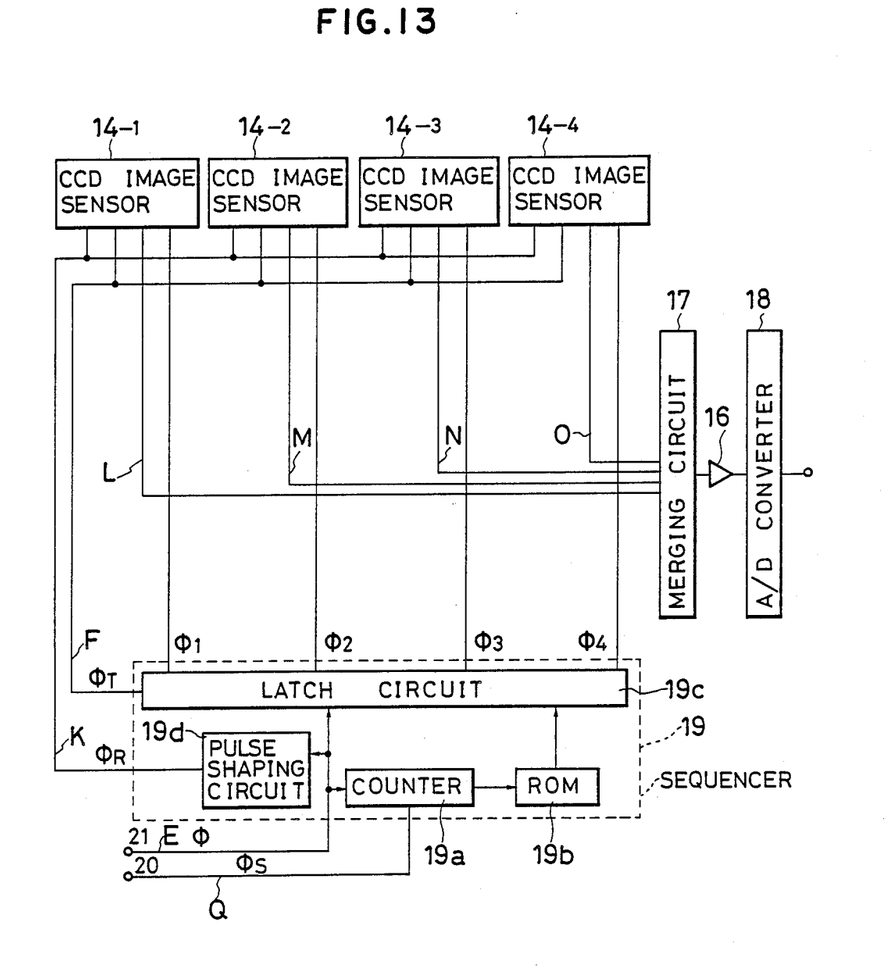
FIG. 13 is a block diagram of a contact-type image scanner illustrating another embodiment of the present invention.

In the embodiment shown in FIG. 13 all of the four image sensors 14-1 to 14-4 are connected to a single merging circuit 17. An alternative arrangement is that in which the image sensors are divided into a plurality of (e.g., two) groups each comprising a plurality of (e.g., two) image sensors, and merging circuits, amplifiers and A/D converters similar to those that have been described are provided in association with respective groups. With such an arrangement, the outputs from the difficult groups can be processed (merged, amplified and A/D-converted) concurrently. This will reduce the time required for reading the signals from the image scanner.

The same concept of the modification can be applied to the embodiment of FIG. 9. Namely, the image sensors 14-1 to 14-4 and associated sensor ampliefiers 16-1 to 16-4 may be divided into a plurality of (e.g., two)

groups, each comprising a plurality of (e.g., two) image sensors and sensor amplifiers, and merging circuits and A/D converters similar to those that have been described may be provided in association with the respective groups.

What is claimed is:

1. A contact-type image scanner having a plurality of CCD image sensors arranged in a row, comprising:
   a timing control means for individually controlling at least one clock control signal for each of said CCD image sensors; and
   a merging circuit for merging output signals from said CCD image sensors into one merged signal output.

2. A contact-type image scanner according to claim 1, wherein said timing control means provides said at least one clock control signal separately to each of said CCD image sensors.

3. A contact-type image scanner according to claim 2, wherein said timing control means successively supplies said at least one clock control signal to said CCD image sensors.

4. A contact-type image scanner according to claim 2, wherein said timing control means supplies said at least one clock control signal simultaneously to a group of CCD image sensors forming at least part of said contact-type image scanner, and successively to pixels of different CCD image sensors of a same group.

5. A contact-type image scanner according to claim 1, wherein said merging circuit comprises an analog adder.

6. A contact-type image scanner according to claim 1, further comprising sensor amplifiers for amplifying said output signals from each CCD image sensors.

7. A contact-type image scanner according to claim 1, further comprising a sensor amplifier for amplifying said merged signal output from said merging circuit.

8. A contact-type image scanner having a plurality of CCD image sensors arranged in a row, each of said CCD image sensors comprising a plurality of pixels and serially outputting pixel signals from respective pixels through a single line, said contact-type image scanner comprising:
   a timing control means for supplying at least one clock signal to each CCD image sensor, said at least one clock signal determining a timing at which said pixel signals of each pixel is output; and
   a merging circuit for merging said pixel signals output from said CCD image sensors into one merged signal output.

9. A contact-type image scanner according to claim 8, wherein said timing control means supplies said at least one clock signal for reading said respective pixels at different timings.

10. A contact-type image scanner according to claim 8, wherein
    said CCD image sensors have separate output nodes for conducting the pixel signals from the pixels of the respective CCD image sensors, and
    said merging circuit has its inputs connected to receive the pixel signals output through the respective output nodes of the respective CCD image sensors.

11. A contact-type image scanner according to claim 8, wherein said at least one clock signal supplied to each of said CCD image sensors during each scan comprises a series of clock pulses.

12. A contact-type image scanner according to claim 11, wherein said timing control means sequentially supplies said series of clock pulses to each CCD image sensors.

13. A contact-type image scanner according to claim 11, wherein said timing control means supplies said series of clock pulses to a plurality of CCD image sensors simultaneously, and supplies the individual clock pulses to the pixels of said plurality of CCD image sensors at different timings.

14. A contact-type image scanner according to claim 11, wherein said timing control means supplies clock pulses to pixels at different timings.

15. A contact-type image scanner according to claim 8, wherein said merging circuit comprises an analog adder.

16. A contact-type image scanner according to claim 8, further comprising sensor amplifiers for amplifying the output signals from the CCD image sensors.

17. A contact-type image scanner according claim 8, further comprising a sensor amplifier for amplifying said merged signal output from said merging circuit.

* * * * *